Jan. 20, 1959 E. D. BRASSEUR 2,869,876

SOUND RECORDING AND REPRODUCING APPARATUS

Filed Nov. 22, 1955 3 Sheets-Sheet 1

Jan. 20, 1959 E. D. BRASSEUR 2,869,876

SOUND RECORDING AND REPRODUCING APPARATUS

Filed Nov. 22, 1955 3 Sheets-Sheet 2

Jan. 20, 1959 E. D. BRASSEUR 2,869,876

SOUND RECORDING AND REPRODUCING APPARATUS

Filed Nov. 22, 1955 3 Sheets-Sheet 3

United States Patent Office 2,869,876
Patented Jan. 20, 1959

2,869,876

SOUND RECORDING AND REPRODUCING APPARATUS

Eudore Desiré Brasseur, Mont-sur-Marchienne, Belgium, assignor to Ateliers de Constructions Electriques de Charleroi, Brussels, Belgium, a corporation of Belgium Application November 22, 1955, Serial No. 548,523

Claims priority, application France May 27, 1955

6 Claims. (Cl. 274—10)

The present invention relates to improvements in sound recording and reproducing devices in which an elongated sound track receiving record is intermittently advanced with a step-by-step movement and the recording and reproducing head moves in alternately reversed directions generally across the record during the period of rest of the record. The present invention particularly relates to apparatus of the type indicated whereby two copies of the recording may be made simultaneously on the same machine.

The invention is particularly applicable to sound recording and reproducing devices of the electro-magnetic type, in which the record at least incorporates a layer of magnetizable material responsive to the head so as to form a sound track on the record when the device is recording and to play back the sound from the sound track when the device is reproducing. In prior apparatus of this type, it is possible to record on only one record at a time. If a copy of the recording is desired, it is necessary to make the recording at the same time with a second apparatus.

In accordance with the present invention, two records are superposed in parallel confronting relationship and are jointly moved step-by-step through the apparatus. Two oppositely facing sonic vibration recording and reproducing heads are provided, one head cooperating with one record and the other head cooperating with the other record. The two heads are moved in alternately reversed directions generally across the record during the periods of rest of the record so that two sound records may be produced simultaneously from a single source of sound. Preferably the two heads are driven in such manner by the same prime mover, and the simultaneous movement of the two heads is in the reverse direction, so that both the records may be played back in the same manner on a machine having one active sound reproducing head.

The sound and reproducing device of the invention is particularly described below in conjunction with the accompanying drawings in which.

Figures 2, 2A:
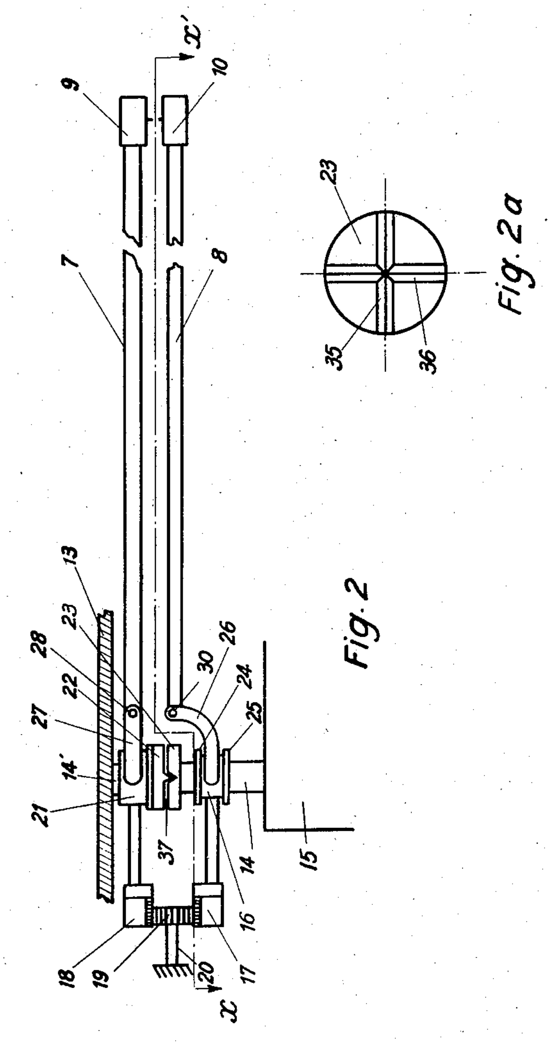
Fig. 2 is a somewhat fragmentary view in vertical section through the apparatus of Fig. 1, certain of the parts being shown in elevation.

Fig. 2*a* is a view in plan of a shaft-part connecting magnet of the apparatus of Fig. 2.

Figure 2B:
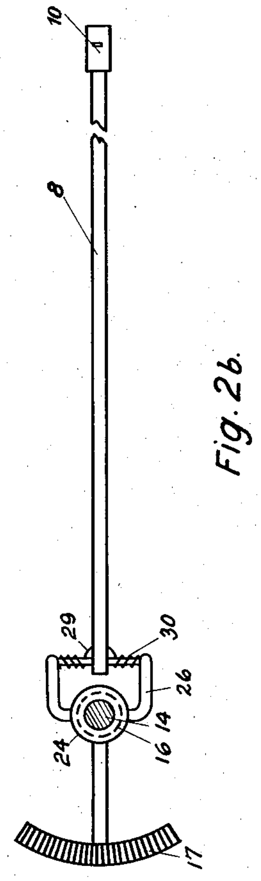

Fig. 2*b* is a horizontal section through the apparatus, the section being taken generally along the line *x*—*x'* of Fig. 2.

Figure 3:
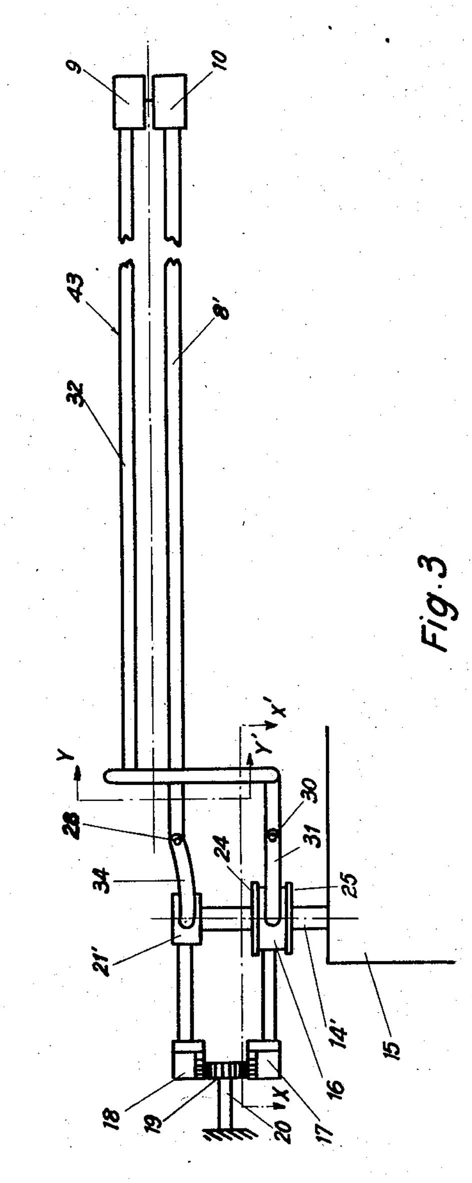

Fig. 3 is a view similiar to Fig. 2, but showing another mounting and driving means for the sound head supporting arms.

Figure 3B:
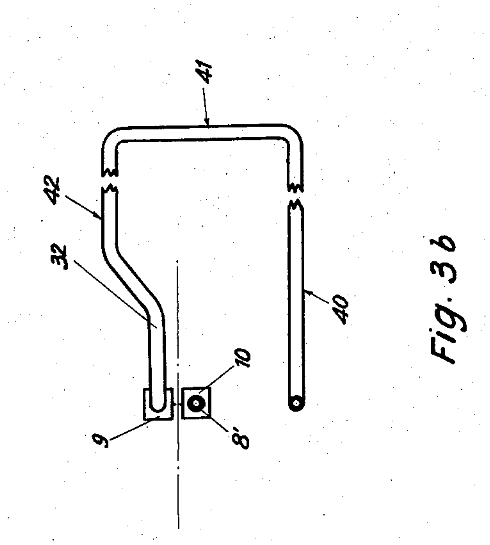
Figure 3A:
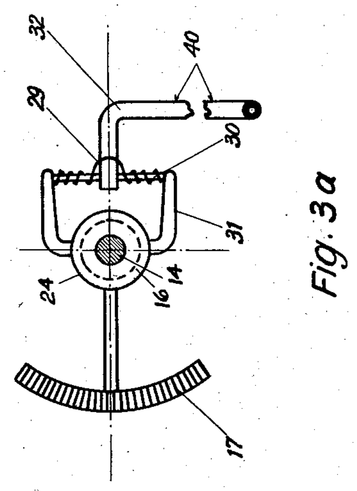

Fig. 3*a* is a fragmentary view in horizontal section through the apparatus of Fig. 3, the section being taken generally along the line X—X' of Fig. 3.

Fig. 3*b* is a fragmentary view in vertical section through the apparatus of Fig. 3, the section being taken generally along the line Y—Y'.

Figure 1:
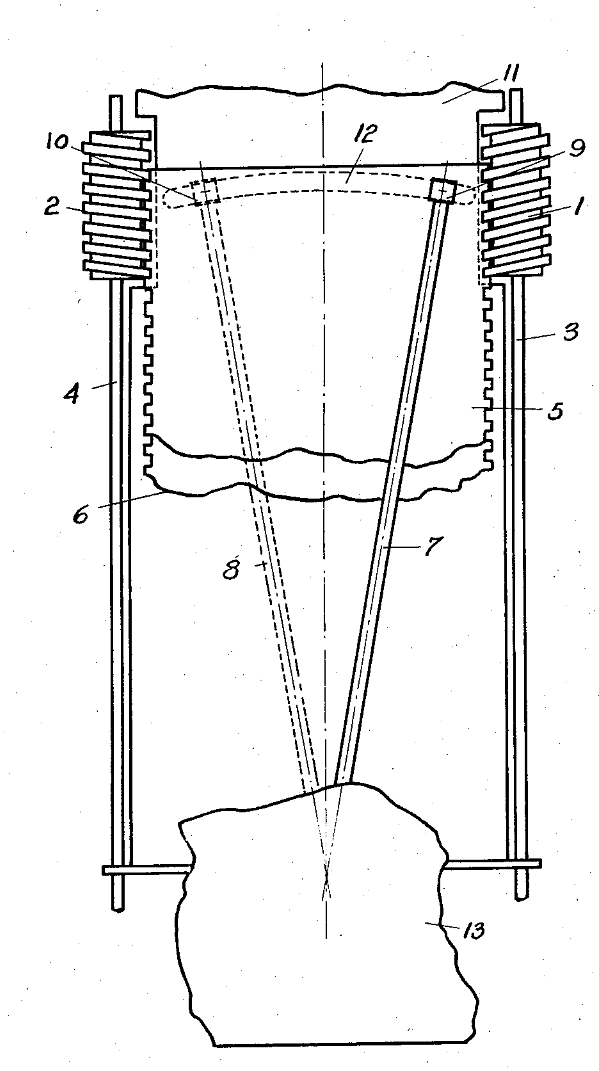
Fig. 1 is a somewhat schematic fragmentary view in plan of the apparatus.

As shown in Fig. 1, the apparatus of the invention is provided with an elongated horizontal supporting plate 11. Two elongated records 5 and 6, placed in confronting contacting relationship, are supported on plate 11 for sliding therealong. The opposed worm gears or screws 1 and 2 are disposed along opposite sides of plate 11 so as to mesh with notches along the longitudinal edges of the record 5 and 6. Worms 1 and 2 are mounted on shafts 3 and 4 respectively, the shafts being connected together and intermittently rotated by means, not shown, so that the records 5 and 6 are advanced together longitudinally of the plate 11 in a step-by-step movement. As shown more clearly in Fig. 2, the apparatus is provided with oppositely facing upper and lower sound recording and reproducing devices of the electro-magnetic type. Each of records 5 and 6 incorporates at least a layer of magnetizable material responsive to its respective head so as to form a sound track on the record when the device is recording and to play back the sound from the sound track when the device is reproducing. Head 9 immediately overlies the upper record 5 and cooperates therewith. An arcuate slot 12 is provided in the supporting plate 11, so that the lower head 10 may cooperate with its record 6 through such slot.

Heads 9 and 10 are supported on the outer free ends of arms 7 and 8 respectively the other, inner ends of such arms being mounted for oscillation about a common axis. The mechanism for oscillating arms 7 and 8 is preferably such that the heads 9 and 10 move simultaneously in opposite directions. The apparatus includes means, not shown, such as shown in my copending U. S. application, Serial No. 529,609, filed August 22, 1955, whereby traverse of the record 5 and 6 is governed by oscillation of at least one of the arms 7 and 8, the heads oscillating while the records are at rest, and the records being traversed when the heads have reached one of their terminal positions.

The means for supporting arms 7 and 8, and for oscillating them in opposite directions, is shown in Figs. 2, 2*a* and 2*b*. A motor, schematically shown at 15, constructed according to the aforementioned copending application has a vertical shaft 14 which is oscillated through the desired angle of movement of arms 7 and 8. A sleeve 16 is loosely mounted on shaft 14, and is held in vertical position between the collars 24 and 25 affixed to the shaft. A yoke 26 projects laterally from sleeve 16, and supports a horizontal shaft 30 between its opposite ends. The inner end of arm 8 is mounted centrally on shaft 30, arm 8 being constantly urged upwardly to bring its head 10 into cooperation with the lower record 6 by means of spring 29 which is mounted on shaft 30 and acts between the ends of yoke 26 and arm 8.

The sound recording and reproducing apparatus of Figs. 1–2*b* is provided with a cover, of which a horizontal portion is shown at 13. Supported on and projected downwardly from portion 13 of the cover is a second shaft 14' positioned coaxially of shaft 14. Shaft 14', which is rotatably supported in cover portion 13 by a means not shown, serves as the support for the arm 7. Non-rotatably connected to shaft 14' is a sleeve portion 21 which carries a second yoke 27, yoke 27 having a cross pin 28 which mounts the inner end of arm 7 in a manner similiar to that employed for arm 8. The apparatus preferably includes a second spring, not shown, positioned about pin 28 and cooperating with yoke 27 and arm 7 which acts as a counter balance for such arm so that its head 9 presses only lightly against record 5.

Between the inner confronting ends of shafts 14 and 14' there is provided a connecting means which is readily dis-engageable simply upon lifting cover portion 13. Such connecting means consists of a lower portion 23 (see Fig. 2*a*) affixed to the upper end of shaft 14, and an upper member 28, affixed to the lower end of shaft 14'. Portion 23 of the connector is provided with cross grooves or indentations 35 and 36, and portion 22 is provided with complementary mating projections, of which one is shown at 37 in Fig. 2. Preferably both parts 22 and 23 are magnets which mutually attract each other, thereby facilitating the making and maintaining of a driving connection between the parts 22 and 23.

It will thus be seen from the above that only parts 22 and 23 are drivingly connected, arm 7 is positively connected to shaft 14 and is oscillated thereby. Arm 8 is drivingly connected to the driven arm 7, so that the two arms move simultaneously and in opposite directions, by a gear segment 18, affixed to hub 21 on shaft 14', a similar gear segment 17 affixed to an arm on sleeve 16, and a pinion 19 interposed between and in mesh with the two gear segments. Pinion 19 is mounted as shown on shaft 20 which is affixed through a fixed part of the frame of the apparatus. When shaft 14', and thus hub 21 and arm 7 are moved in one direction, gear segment 18 connected thereto drives the other gear segment 17 in such manner as to move arm 8 in a direction opposite from arm 7. When the cover of the apparatus, including a portion 13, is removed, it carries with it not only arm 7, shaft 14', and hub 21, as above noted, but it also carries with it gear segment 18 and thus serves to disconnect the interconnecting reverse driving means between the two arms.

It will be understood that, because the shafts 14, 14', and the connecting means 22, 23 therebetween intersect the plane of the record 5 and 6 in the above described apparatus, such apparatus can be used only with records 5 and 6 which are relatively short. If it is desired to employ with the apparatus of the invention sound records which are elongated and of indefinite length, an apparatus such as shown in Figs. 3–3*b* may be employed. In such apparatus parts which are the same as those of Figs. 1 to 2*b* inclusive are designated by the same reference characters. In this construction the vertically extending oscillatory shaft 14' of motor 15 terminates below the horizontal plane of the records 5 and 6. Hub 21', located on the upper end of shaft 14', serves as a support for yoke 34. Yoke 34 supports the lower arm 8', bearing lower head 10, the arm being pivotally mounted to the yoke by the pin 28. Sleeve 16, as before, is rotatably mounted on the vertical oscillatory shaft, the sleeve supporting a yoke 31 having a cross pin 30 thereon connected to the inner end of arm 32 which bears the upper sound recording head 9. Spring 29, shown in Fig. 3*a*, functions as a partial counter balance for arm 32 and its head 9, whereby the head bears lightly against its sound record 5. In order to clear the sound records, and to allow the use of records of indefinite length, the arm 32 is bent into the shape shown in Figs. 3, 3*a*, and 3*b*. As shown, arm 32 extends a short distance from yoke 31 in a direction towards its head 9, is then bent to extend laterally in a run 40 of sufficient length so that the next, vertical run 41 thereof clears the edges of the records at all times. The arm then extends inwardly toward the longitudinal center of the sound records in a run 42, after which it connects with a straight elongated portion 43 which carries head 9 on its outer end.

The sound recording and reproducing apparatus of the invention permits not only the simultaneous recording of the same message or sound on two separate records, but it also allows the utilization of a record which is coated with a magnetizable film on its two surfaces and the simultaneous recording on both such surfaces. Alternatively, if it is desired to use two surfaces consecutively, the first part of a message may be recorded on one side of the record, the head cooperating with the other side of the record being then disconnected, after which the other head is connected and the head first used disconnected, and the recording continued, without removing the record from the machine, by reversing the direction of traverse of the record.

While preferred embodiments of the sound recording and reproducing apparatus of the invention have been shown by way of example in the drawings and particularly described, it will be understood that the invention is in no way limited to such embodiments.

What I claim and desire to secure by Letters Patent is:

1. A sound recording and reproducing device comprising means for jointly moving two records in parallel confronting relationship step-by-step in a given path, two oppositely facing sonic vibration recording and reproducing heads, one head cooperating with one record and the other head cooperating with the other record, a shaft extending transversely to the plane of the records on the longitudinal center line thereof, a supporting arm for each of the heads mounted on the shaft, and means including a motor for driving the shaft for simultaneously oscillating the two arms in opposite directions between terminal positions so that the heads travel generally transverse to the direction of movement of the records during successive periods in which the records are at rest.

2. Sound recording and reproducing apparatus as claimed in claim 1, in which one head supporting arm is freely pivotally mounted on the shaft, the other head supporting arm is fixedly connected to the shaft, and there is a connection between the first and second arm whereby the latter arm is driven from the former in reverse directions with respect thereto.

3. Sound recording and reproducing apparatus as claimed in claim 2, in which the driving connection between the first and second arm comprises confronting gear sectors connected to the respective arms, and a pinion interposed between and meshing with the sectors.

4. A sound recording and reproducing device comprising means for jointly moving two records in parallel confronting relationship step-by-step in a given path, two oppositely facing sonic vibration and reproducing heads, one head cooperating with one record and the other head cooperating with the other record, a supporting arm for each of the respective heads, the arms being mounted to oscillate about the axis of a divided shaft, the device having a cover, one portion of the shaft being mounted on the cover and carrying one of said head supporting arms, the other portion of the shaft being mounted in the main body of the machine and carrying the other head supporting arm, and a disconnectable driving means between the two parts of the shaft, one of said arms being fixedly connected to its shaft part to be driven thereby and the other of said arms being loosely mounted on its shaft part, a reverse movement connection between the idle and driven arms, a portion of such reverse movement connection being carried on the cover, whereby when the cover is removed the arm carried thereby and a portion of the reverse movement connection is removed therewith, and a motor for driving the shaft so that the heads are moved between terminal positions in opposite directions generally transverse to the direction of movement of the records during successive periods in which the records are at rest.

5. Sound recording and reproducing apparatus as claimed in claim 4, in which the disengageable connection between shaft parts comprises two mutually attractive magnets affixed to their respective shaft parts, said magnets having meshing teeth and grooves on their confronting faces.

6. A sound recording and reproducing device comprising means for jointly moving two records in parallel confronting relationship step-by-step in a given path, two oppositely facing sonic vibration recording and reproducing heads, one head cooperating with one record and the other head cooperating with the other record, a shaft extending transverse to the path of movement of the sound records and located generally in a central longitudinal plane normal to the record and on one side thereof, a supporting arm for each of said heads, one of said arms extending generally radially of the shaft, the other of said arms extending from the shaft to one side of the records, then toward and beyond the records generally normal to the plane thereof, inwardly across the record, and finally generally longitudinally of the record, so that records of indefinite length may be employed with the device, and means for moving the arms including a motor for driving the shaft and a reverse driving connection between the arms so that the heads are moved between terminal positions in opposite directions simultaneously generally transverse to the direction of movement of the records during successive periods in which the records are at rest.

References Cited in the file of this patent

FOREIGN PATENTS

| | | |
|---|---|---|
| 743,953 | France | Apr. 10, 1933 |
| 877,126 | France | Nov. 27, 1942 |
| 598,584 | Germany | June 15, 1934 |